United States Patent
Vosburgh et al.

(10) Patent No.: US 9,519,062 B2
(45) Date of Patent: Dec. 13, 2016

(54) METHODS, SYSTEMS, AND COMPUTER READABLE MEDIA FOR MITIGATION OF IN-BAND INTERFERENCE OF GLOBAL POSITIONING SYSTEM (GPS) SIGNALS

(71) Applicant: Physical Devices LLC, Durham, NC (US)

(72) Inventors: Frederick Vosburgh, Durham, NC (US); Charley Theodore Wilson, III, Raleigh, NC (US)

(73) Assignee: Physical Devices, LLC, Durham, NC (US)

( * ) Notice: Subject to any disclaimer, the term of this patent is extended or adjusted under 35 U.S.C. 154(b) by 581 days.

(21) Appl. No.: 13/781,226

(22) Filed: Feb. 28, 2013

(65) Prior Publication Data
US 2014/0152499 A1   Jun. 5, 2014

Related U.S. Application Data

(60) Provisional application No. 61/604,480, filed on Feb. 28, 2012.

(51) Int. Cl.
*G01S 19/21* (2010.01)
*H01Q 21/28* (2006.01)
(Continued)

(52) U.S. Cl.
CPC ............. *G01S 19/215* (2013.01); *H01Q 21/28* (2013.01); *H01Q 1/32* (2013.01); *H01Q 1/52* (2013.01); *H01Q 11/10* (2013.01)

(58) Field of Classification Search
CPC ............. G01S 19/21; G01S 7/36; H04K 3/90; H04K 3/224; H04K 3/228; H04B 1/126; H01Q 21/29
(Continued)

(56) References Cited

U.S. PATENT DOCUMENTS 3,946,337 A   3/1976   Philips et al.
4,085,368 A   4/1978   Yeh
(Continued)

FOREIGN PATENT DOCUMENTS

EP   1 727 277 A1   11/2006
WO   WO 2012/030658 A2   3/2012
(Continued)

OTHER PUBLICATIONS

Notice of Allowance and Fee(s) Due for U.S. Appl. No. 13/271,420 (Oct. 15, 2013).
(Continued)

*Primary Examiner* — Gregory C Issing
*Assistant Examiner* — Helena Seraydaryan
(74) *Attorney, Agent, or Firm* — Jenkins, Wilson, Taylor & Hunt, P.A.

(57) ABSTRACT

Methods, systems, and computer readable media for mitigation of interference of GPS signals are disclosed providing selective mitigation of in-band interference implementing deterministic phase control. In one embodiment, a system for mitigating interference of GPS signals includes a pair of antennas, each receiving GPS signals that include both a desired signal component and a jammer signal component. The signal from one antenna is phase-shifted as needed to make it anti-phase with the signal from the other antenna, so that when the two signals are combined, the jammer signal components substantially cancel each other, leaving the desired signal components. Determining the phase shift required involves deterministically calculating the phase shift based on the amplitudes of the two input signals and the amplitude of the combined signal instead of the iterative techniques used in conventional systems.

39 Claims, 7 Drawing Sheets

(51) Int. Cl.
*H01Q 1/32* (2006.01)
*H01Q 1/52* (2006.01)
*H01Q 11/10* (2006.01)

(58) Field of Classification Search
USPC .......... 342/357, 379, 380, 383, 384, 357.59
See application file for complete search history.

(56) References Cited

U.S. PATENT DOCUMENTS

| | | | |
|---|---|---|---|
| 4,313,116 A | | 1/1982 | Powell et al. |
| 5,179,727 A | | 1/1993 | Imagawa |
| 5,252,930 A | | 10/1993 | Blauvelt |
| 5,285,479 A | | 2/1994 | Iwane |
| 5,386,198 A | | 1/1995 | Ripstrand et al. |
| 5,412,735 A | | 5/1995 | Engebretson et al. |
| 5,442,582 A | | 8/1995 | Lange et al. |
| 5,712,641 A | | 1/1998 | Casabona et al. |
| 5,736,909 A | | 4/1998 | Hauser et al. |
| 5,783,977 A | | 7/1998 | Chethik |
| 5,872,540 A | * | 2/1999 | Casabona et al. ............ 342/362 |
| 6,154,641 A | | 11/2000 | Zhang |
| 6,172,970 B1 | | 1/2001 | Ling et al. |
| 6,175,327 B1 | | 1/2001 | Lin et al. |
| 6,201,955 B1 | | 3/2001 | Jasper et al. |
| 6,236,315 B1 | * | 5/2001 | Helms et al. ............... 340/572.7 |
| 6,314,127 B1 | | 11/2001 | Lynch et al. |
| 6,323,806 B1 | * | 11/2001 | Greving ........................ 342/372 |
| 6,359,503 B1 | | 3/2002 | Alini et al. |
| 6,363,263 B1 | | 3/2002 | Reudink et al. |
| 6,385,435 B1 | | 5/2002 | Lee |
| 6,486,828 B1 | | 11/2002 | Cahn et al. |
| 6,590,528 B1 | | 7/2003 | DeWulf |
| 6,639,541 B1 | | 10/2003 | Quintana et al. |
| 6,710,739 B1 | | 3/2004 | Loegering |
| 6,847,803 B1 | | 1/2005 | Rauhala et al. |
| 6,961,577 B2 | | 11/2005 | Nagato et al. |
| 7,139,592 B2 | | 11/2006 | Leifer et al. |
| 7,904,047 B2 | | 3/2011 | Darabi |
| 8,032,103 B2 | | 10/2011 | Lackey |
| 8,064,837 B2 | | 11/2011 | Sampath |
| 8,078,100 B2 | | 12/2011 | Proctor, Jr. et al. |
| 8,086,206 B1 | | 12/2011 | Lackey |
| 8,090,338 B1 | | 1/2012 | Lackey |
| 8,090,339 B1 | | 1/2012 | Lackey |
| 8,351,889 B2 | | 1/2013 | Roussel et al. |
| 8,355,676 B2 | | 1/2013 | Franklin |
| 8,380,771 B2 | | 2/2013 | Hahn et al. |
| 8,666,347 B2 | | 3/2014 | Wilkerson et al. |
| 8,682,275 B2 | | 3/2014 | Kerth et al. |
| 8,965,319 B2 | | 2/2015 | Wilkerson et al. |
| 9,042,857 B2 | | 5/2015 | Vosburgh et al. |
| 9,203,461 B2 | | 12/2015 | Vosburgh et al. |
| 9,219,508 B1 | | 12/2015 | Veysoglu et al. |
| 9,350,401 B2 | | 5/2016 | Wilkerson |
| 2002/0122406 A1 | | 9/2002 | Chillariga et al. |
| 2002/0125947 A1 | | 9/2002 | Ren |
| 2003/0130751 A1 | | 7/2003 | Lim |
| 2004/0185815 A1 | | 9/2004 | Fukuda et al. |
| 2006/0262880 A1 | | 11/2006 | Mizuta et al. |
| 2007/0066226 A1 | | 3/2007 | Cleveland et al. |
| 2008/0136473 A1 | | 6/2008 | Bollenbeck et al. |
| 2008/0211715 A1 | * | 9/2008 | Feintuch et al. ......... 342/357.12 |
| 2010/0022197 A1 | | 1/2010 | Kato et al. |
| 2010/0048156 A1 | * | 2/2010 | Hahn ............................ 455/296 |
| 2010/0136925 A1 | | 6/2010 | Lackey |
| 2010/0136941 A1 | | 6/2010 | Lackey |
| 2010/0178874 A1 | | 7/2010 | Chiou et al. |
| 2010/0244943 A1 | | 9/2010 | Hahn et al. |
| 2011/0019722 A1 | | 1/2011 | Amirkhany |
| 2011/0227665 A1 | | 9/2011 | Wyville |
| 2011/0300813 A1 | | 12/2011 | Mirzaei et al. |
| 2012/0025929 A1 | | 2/2012 | Muterspaugh et al. |
| 2012/0201153 A1 | | 8/2012 | Bharadia et al. |
| 2012/0201173 A1 | | 8/2012 | Jain et al. |
| 2012/0252392 A1 | | 10/2012 | Wilkerson et al. |
| 2013/0225099 A1 | | 8/2013 | Vosburgh et al. |
| 2014/0185723 A1 | | 7/2014 | Belitzer |
| 2014/0199956 A1 | | 7/2014 | Wilkerson |
| 2015/0244431 A1 | | 8/2015 | Vosburgh |
| 2015/0288413 A1 | | 10/2015 | Vosburgh et al. |
| 2016/0087659 A1 | | 3/2016 | Vosburgh et al. |

FOREIGN PATENT DOCUMENTS

| | | |
|---|---|---|
| WO | WO 2013/058270 A1 | 4/2013 |
| WO | WO 2013/130818 A1 | 9/2013 |
| WO | WO 2014/113613 A1 | 7/2014 |

OTHER PUBLICATIONS

Bharadia et al., "Full Duplex Radios," pp. 1-12 (Aug. 12, 2013).

Notification of Transmittal of the International Search Report and the Written Opinion of the International Searching Authority, or the Declaration for PCT International Patent Application No. PCT/US2013/028338 (Jul. 25, 2013).

Notice of Allowance and Fee(s) Due for U.S. Appl. No. 13/271,420 (Jun. 25, 2013).

Communication of European Publication Number and Information on the Application of Article 67(3) EPC for European Patent Application No. 11822404.7 (Jun. 12, 2013).

Notification of Transmittal of the International Search Report and the Written Opinion of the International Searching Authority, or the Declaration for PCT International Patent Application No. PCT/US2012/066259 (Mar. 28, 2013).

Non-Final Action for U.S. Appl. No. 13/271,420 (Feb. 6, 2013).

Commonly assigned, co-pending U.S. continuation-in-part U.S. Appl. No. 13/745,729 titled "Methods, Systems, and Non-Transitory Computer Readable Media for Wideband Frequency and Bandwidth Tunable Filtering," (unpublished, filed Jan. 18, 2013).

International Search Report for International Patent Application No. PCT/US2011/049399 (Mar. 2, 2012).

Jain et al., "Practical, Real-time, Full Duplex Wireless," pp. 1-12 (Sep. 19, 2011).

U.S. Appl. No. 61/485,980 for "Adaptive Techniques for Full-Duplex Wireless," (May 13, 2011).

U.S. Appl. No. 61/462,493 for "Single Channel Full-Duplex Wireless Communication," (Feb. 3, 2011).

Choi et al., "Achieving Single Channel, Full Duplex Wireless Communication," pp. 1-12 (Sep. 20, 2010).

Commonly-assigned, co-pending U.S. Appl. No. 14/629,326 for "Devices and Methods for Diversity Signal Enhancement and Cosite Cancellation," (Unpublished, filed Feb. 23, 2015).

Non-Final Office Action for U.S. Appl. No. 13/820,064 (Feb. 18, 2015).

Notice of Allowance and Fee(s) Due for U.S. Appl. No. 13/745,729 (Jan. 22, 2015).

Communication of European Publication Number and Information on the Application of Article 67(3) EPC for European Patent Application No. 13754265.0 (Dec. 10, 2014).

Restriction/Election Requirement for U.S. Appl. No. 13/745,729 (Nov. 12, 2014).

First Office Action for Chinese Patent Application No. 201180051482.8 (Oct. 29, 2014).

Notice of Allowance and Fee(s) Due for U.S. Appl. No. 14/194,924 (Oct. 17, 2014).

Communication of European Publication Number and Information on the Application of Article 67(3) EPC for European Patent Application No. 12839313.9 (Jul. 23, 2014).

Non-Final Office Action for U.S. Appl. No. 14/194,924 (Jun. 13, 2014).

Notification of Transmittal of the International Search Report and the Written Opinion of the International Searching Authority, or the Declaration for PCT International Patent Application No. PCT/US2014/011941 (Apr. 29, 2014).

Extended European Search Report for European Application No. 11822404.7 (Jan. 17, 2014).

(56) References Cited

OTHER PUBLICATIONS

Communication of European publication number and information on the application of Article 67(3) EPC for European Application No. 14740838.9 (Oct. 28, 2015).
Extended European Search Report for European Patent Application No. 13754265.0 (Oct. 14, 2015).
Extended European Search Report for European Patent Application No. 12839313.9 (Sep. 24, 2015).
Restriction and/or Election Requirement for U.S. Appl. No. 14/629,326 (Sep. 23, 2015).
Final Office Action for U.S. Appl. No. 13/820,064 (Sep. 9, 2015).
Notice of Allowance and Fee(s) Due for U.S. Appl. No. 14/719,302 (Jul. 31, 2015).
Communication pursuant to Rule 164(1) EPC for European Patent Application No. 12839313.9 (Jun. 2, 2015).
Widrow et al., "Adaptive Inverse Control," Proceedings of the 1993 International Symposium on Intelligent Control, pp. 1-6 (Aug. 1993).
Notice of Allowance and Fee(s) Due for U.S. Appl. No. 14/927,374 (May 23, 2016).
Commonly-assigned, co-pending U.S. Appl. No. 15/149,030 for "Tunable Filter Devices and Methods," (Unpublished, filed May 6, 2016).
Non-Final Office Action for U.S. Appl. No. 14/927,374 (Jan. 25, 2016).
Notice of Allowance and Fee(s) Due for U.S. Appl. No. 13/820,064 (Jan. 22, 2016).
Non-Final Office Action for U.S. Appl. No. 14/629,326 (Jan. 22, 2016).

* cited by examiner

METHODS, SYSTEMS, AND COMPUTER READABLE MEDIA FOR MITIGATION OF IN-BAND INTERFERENCE OF GLOBAL POSITIONING SYSTEM (GPS) SIGNALS

RELATED APPLICATIONS

The presently disclosed subject matter claims the benefit of U.S. Provisional Patent Application Ser. No. 61/604,480, filed Feb. 28, 2012; the disclosure of which is incorporated herein by reference in its entirety.

TECHNICAL FIELD

The subject matter described herein relates to methods and systems for enhancing reception of wireless signals. More particularly, the subject matter described herein relates to methods, systems, and computer readable media for mitigation of in-band interference of GPS signals.

BACKGROUND

GPS signals play an ever increasing role in our commercial, civil and military enterprises, providing everything from cell tower synchronization to delivery truck tracking and unmanned vehicles navigation. This reliance on GPS makes the growing frequency, power and sophistication of interference affecting its reception a substantial threat to our economy, as well as our homeland and national security.

Disruptive jamming and spoofing, a particularly insidious form of jamming, apparently were used by Iran to capture a US drone. Spoofing signals are GPS mimics that are broadcast intentionally in the GPS band to mask the actual signals and suborn the drone autopilot to lead the vehicle astray. Furthermore, more powerful signals from easily fabricated transmitters can blind a GPS receiver, potentially causing airline crashes as well as disrupting our national infrastructure.

Technology proposed to combat interference affecting GPS or other radio frequency (RF) receivers can be classed generally as digital signal processing, analog filtering, or steered antennas. Digital signal processing methods are sophisticated and diverse but depend on signals with an adequate signal to noise ratio (SNR) and preferably free of distortion before they are digitized. These methods can also require long signal records and substantial computation. Analog bandpass filters improve signal to noise ratio by rejecting frequencies outside a desirable frequency range. While this reduces the risk of distortion, it is ineffective against interference occurring at passband frequencies. Array steering is used to reduce receiver sensitivity in the direction of a jamming source but has several disadvantages: the hardware imposes a substantial burden in terms of size, weight, power, cost, and computational complexity; and array steering equally reduces sensitivity to desirably received signals from the direction of the null and other bearings represented by null side lobes. As a result, null steering is largely restricted to ground stations or large vehicles with the payload capacity and energy to provide the required hardware and power.

Conventional systems for defeating interference rely on temporal or spatial diversity. Temporal diversity excises from an antenna signal periods of time when interference is present to avoid its degrading a signal of interest (SI). Spatial diversity relies on differences in direction of propagation between interference and SI, acting to reduce sensitivity of the receiving system to signals from the direction of the interference. Sensitivity can be reduced by mechanically or electrically steering a null in the direction of the interference or by using directional antennas oriented in the direction of the interference and of SI. In this, defeat of interference without degrading SI requires a large number of array antenna elements, computationally intensive calculation of weightings applied to array element signals, and/or steered directional antennas. Such spatial diversity technology, however, also degrades SI propagating from a direction proximate that of the interference. And, the use of fewer array elements and/or less directional antennas broadens the null, resulting in cancellation of SI over wide ranges of bearing and reducing overall system performance. In light of this, technology that can defeat interference at any bearing including those proximate in bearing to SI, and doing so without large numbers of array elements or use of directional antennas, is clearly desirable.

In light of the above, we propose GPS receivers comprising selective cancellation of spoofing and other types of in-band interference using omnidirectional receiving antennas providing greater angular operating range and cancellation bandwidth at reduced cost and complexity.

OBJECT OF THE INVENTION

A first object of the invention is enhanced reception of navigation signals. A second object is enhanced reception of radio frequency signals. A third object is mitigation of signals that degrade GPS reception. A fourth object is mitigation of GPS spoofing. A fifth object is mitigating multiple sources of interference. A sixth object is reducing signal power entering a receiver.

SUMMARY

Devices and methods are disclosed for phase-controlled filtering of GPS signals to mitigate spoofing and other types of in-band interference.

According to one aspect, the subject matter described herein includes a device for phase-controlled filtering of GPS signals to mitigate spoofing and other types of in-band interference. The device includes at least one of: an antenna set, a feed-forward type signal modifying circuit, a signal converter circuit, and a receiver circuit. The antenna set includes a first antenna and a second antenna that can receive signals at GPS frequencies and an emitter antenna of any type that can emit a modified second antenna signal. Modifying circuitry may be any type that can modify signals from the second antenna, comprising at least one of: a detector, an amplifier, a phase shifter, a delay element, a combiner, and a controller. The converter circuit may be any type that can convert a signal for digital processing. The receiver may be any type that can process an antenna signal to provide enhanced GPS output.

According to another aspect, the subject matter described herein includes a method for phase-controlled filtering of GPS signals to mitigate spoofing and other types of in-band interference. The method includes modifying an antenna signal by amplitude equalizing, phase shifting and/or group delaying, followed by combining modified signals to selectively cancel interference content. Phase shifting is conducted according to a deterministic solution providing antiphase alignment of desirably mitigated signals at the combiner. In one embodiment, a first antenna comprises a combiner that combines interaction signals induced at the antenna surface; an element of the modifying circuitry is used to combine antenna signals from antennas. The method includes delay compensation to modify cancellation bandwidth. Cancellation, which can be used to reduce more than one source or type of interference, is performed to provide an enhanced antenna signal. The enhanced signal is converted and processed to provide an enhanced GPS output, e.g. signal, data, message or display.

In one embodiment, the antenna set includes two adjacent coplanar patch type antennas and an emitter mounted immediately beneath the first patch antenna. The patch antennas are primarily omnidirectional and emitter is primarily directional. The first antenna may be any type that can combine interaction signals induced at the antenna surface by simultaneously arriving RF signals. Modifying circuitry may be any type that can anti-phase align an emitter type interaction signal with an interaction signal induced by a signal including GPS and interference contents. Modifying circuitry may be any type that can combine a plurality of antenna signals.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
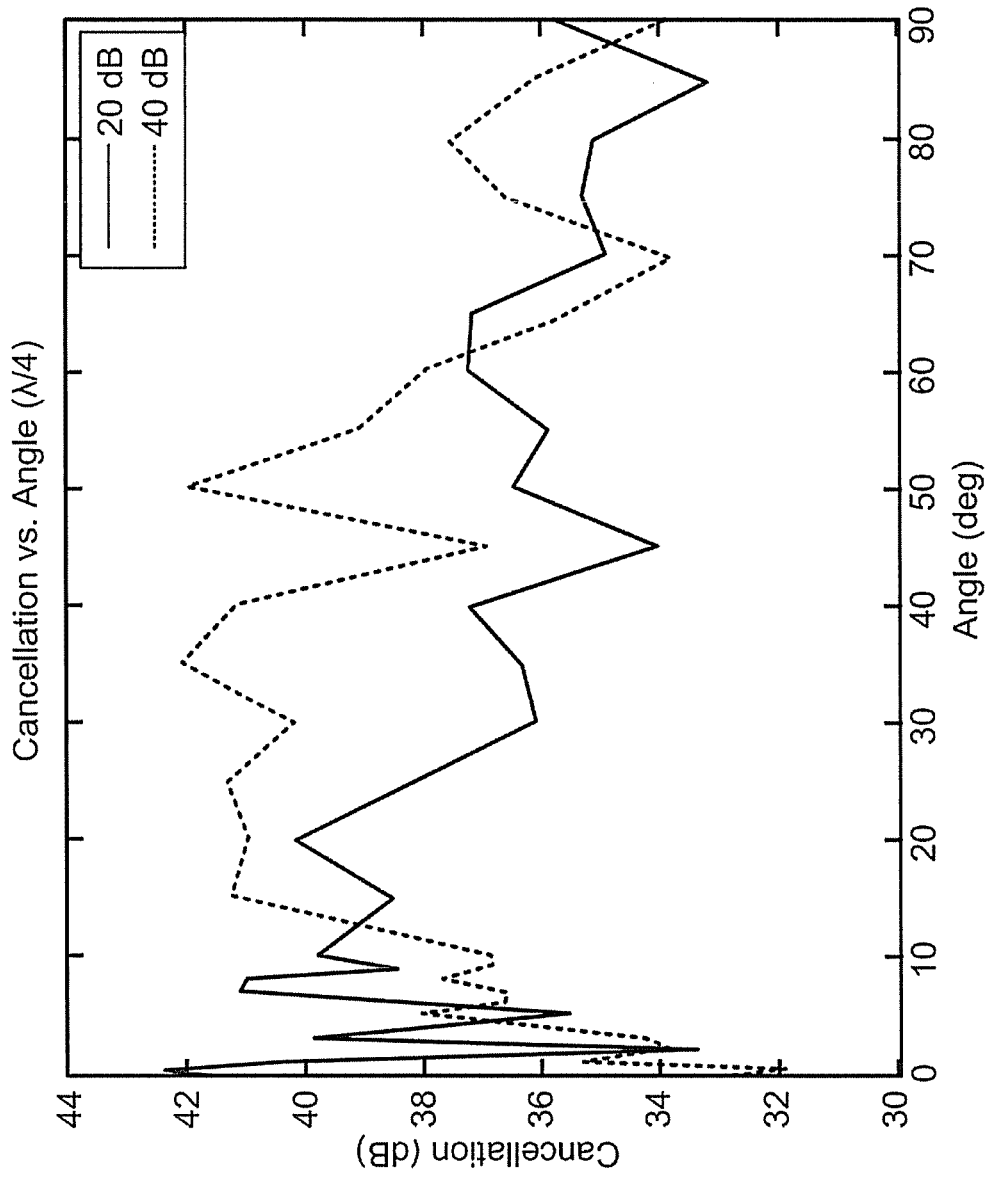
FIG. 1 is a graph of the performance of a system according to an embodiment of the subject matter described herein, illustrating a high degree of cancellation of boresight interference.

In accordance with the subject matter disclosed herein, systems, methods, and computer readable media are provided for providing enhanced GPS reception by selectively cancelling spoofing, jamming and other types of interference (referred to collectively hereinafter as interference) at desirably received frequencies.

This disclosure is in terms of GPS signals but the concepts described herein may be applied to navigation, sensing, and/or communications signals of other types and/or at other frequencies. Examples of other frequencies that are used with or instead of GPS signals to synchronize wireless communications include, but are not limited to, the pilot signal components of long term evolution (LTE) signals. In one embodiment, a null is frequency aligned with the interference and/or the transmission to mitigate interference and provide enhanced synchronization. It is described for canceling one or two sources of interference but the concepts described herein may be applied to cancel more than two sources of interference. Boresight interference is defined as interference propagating on a bearing that is more or less the same as a signal of interest, the latter represented herein by a GPS signal. A non-boresight bearing may be any bearing that is substantially away from boresight, e.g. 5 or more degrees apart.

The present disclosure is in terms of interfered signals, defined here as including GPS signal content and jamming and/or spoofing signal content but the concepts described herein may be applied to interfered signals comprising any type of interference. For purposes of the current disclosure, spoofing is define as a type of intentional interference It is in terms of a plurality of antenna signals, such as from a plurality of antennas, although it can also be practiced with one or more polarization signals from one antenna. Antenna signals are characterized by differences in at least one of: amplitude, phase, delay, polarization, and bearing separation.

For the purposes of the present disclosure, interaction signals are defined as those induced at an antenna face by interaction of an RF signal with the face of the antenna, and antenna signals are signals from an antenna due to induction of an interaction signal. Distortion filtering is defined as means of preventing with respect to at least one frequency the output of distortion induced by at least one distortion inducing type of circuitry element such as an active type. Distorting, such as by amplifying a signal to induce distortion is defined here as a type of signal modification.

Devices and methods for phase-controlled in-band filtering that reduces amplitude of an undesirable signal with respect to at least one frequency of a desirably received signal as a means of providing enhanced reception of position, navigation and timing ("GPS") signals are disclosed. Devices comprise at least one of: an antenna set, a feed-forward type signal modifying circuitry, a signal converter circuit, and a receiver circuit that can be of any type providing an enhanced GPS output. In one embodiment, an antenna set includes two omnidirectional antennas of any type that can receive GPS signals and an emitter type antenna of any type that can emit a signal that can induce interaction signals at the first antenna surface. An antenna set may be any type that can provide an enhanced first antenna signal. Modifying circuitry may be any type that can modify at least one antenna signal. Modifying circuitry includes at least one of: a detector, an amplifier, a phase shifter, a delay element, a combiner, and a controller. Detector is any type that can detect at least one of; amplitude, phase and delay. A converter circuit may be any type that can convert an enhanced antenna signal for digital processing. A converter includes at least one type of; signal conditioning, digital converting, mixing, down converting, direct sampling, demodulating and intermediate stage filtering. A receiver may be any type that can process an antenna signal to provide an enhanced GPS output. A receiver includes any type of digital signal processor that can provide at least one of: decoding, decrypting, determining of at least one of: position, navigation and timing type signals, and output providing.

One embodiment of the method includes phase shifting at least one amplitude modified signal according to a deterministic solution. In other embodiments, computationally less efficient solutions such as error minimization, synthetic annealing and steepest descent may be used. The method includes steps of phase shifting and electrical combining as means of at least partly cancelling interference in an arriving GPS signal to produce an enhanced antenna signal. In some cases, the method includes amplitude equalizing prior to phase shifting. Cancellation can be conducted by combining interaction signals at the surface of an antenna and/or combining antenna signals in circuitry. Cancellation can be provided for more than one source of interference. An enhanced signal is converted by a converter circuit and the converted signal is processed in a receiver circuit to provide enhanced GPS output of any type, e.g. signal, data, message or display.

One acceptable antenna set includes two adjacent coplanar patch antennas and an emitter antenna mounted immediately beneath a first patch antenna to provide an emitter signal created by modification of a signal from a second patch antenna, said emitter signal being modified so as to induce an interaction signal at the face of the first antenna which is amplitude equivalent to and anti-phase with respect to the interaction signal induced at the first antenna surface by interference.

Modifying circuitry may be any type that can provide at least one of: delaying, amplifying, phase shifting and combining. Antennas are characterized by at least one of: type, frequency range, bandwidth, gain pattern and/or polarization. A converter may be any device that can convert a signal to digital form. A receiver may be any type that can provide a GPS output by processing converted signal.

It will be appreciated by those versed in the art that identical signals arriving at an antenna from different locations, once amplitude compensated for antenna gain pattern, will induce exactly the same interaction signal in the face of the antenna. By extension, two simultaneously arriving signals having an anti-phase relationship will induce anti-phase interaction signals that cancel, resulting in no net interaction signal induction. From this, it can be seen that the antenna includes a type of combiner.

It will also be appreciated that the interference signal content is highly correlated between antenna signals, as is GPS contents between antenna signals, while interference content and GPS content within a signal, being induced by separate sources are not correlated. This difference in correlation between and within signals is exploited here to selectively cancel interference content while retaining GPS content, yielding a GPS signal substantially free of interference content.

The interference content in an interfered signal, being stronger than GPS content, dominates measurements of an interfered signal, thereby affecting calculations and modifications based on such measurements. For example, phase shifting of an interfered signal with respect to another to provide anti-phase alignment provides anti-phase alignment of interference contents but not of GPS contents. As a result, antenna combining of anti-phase interfered signals substantially cancels interference content but not GPS content, yielding a GPS signal having an enhanced signal to noise ratio (SNR).

The subject matter described herein provides several benefits over conventional systems, including: the ability to cancel interference without requiring a difference in ratio of jamming to desired signals between antenna signals and without requiring temporal or spatial diversity; the ability to provide broadband cancellation instead of the narrow bandwidth resulting from the set-apart antenna configuration of receiving antennas used by conventional systems; the ability to operate in a flush mounted configuration suitable for mounting on vehicles that are desirably aerodynamic and/or free of elements that can be damaged or entangled during operation; and the ability to minimize cosite interaction of its antennas and of nearby antennas.

FIG. 1 is a graph of the performance of a system according to an embodiment of the subject matter described herein, illustrating a high degree of cancellation of boresight interference. FIG. 1 illustrates data recorded during field testing of an embodiment of the present invention having two vertically mounted commercial omnidirectional type whip antennas separated by 0.25 lambda of the test center frequency, which antennas are used to receive signals from sources transmitting interference and desirably received signals at 700 MHz signals from a range of 10 m, which sources are separated by angles up to 90 degree apart, illustrating clearly a high degree of cancellation of boresight interference by an embodiment of the present invention.

Figure 2:
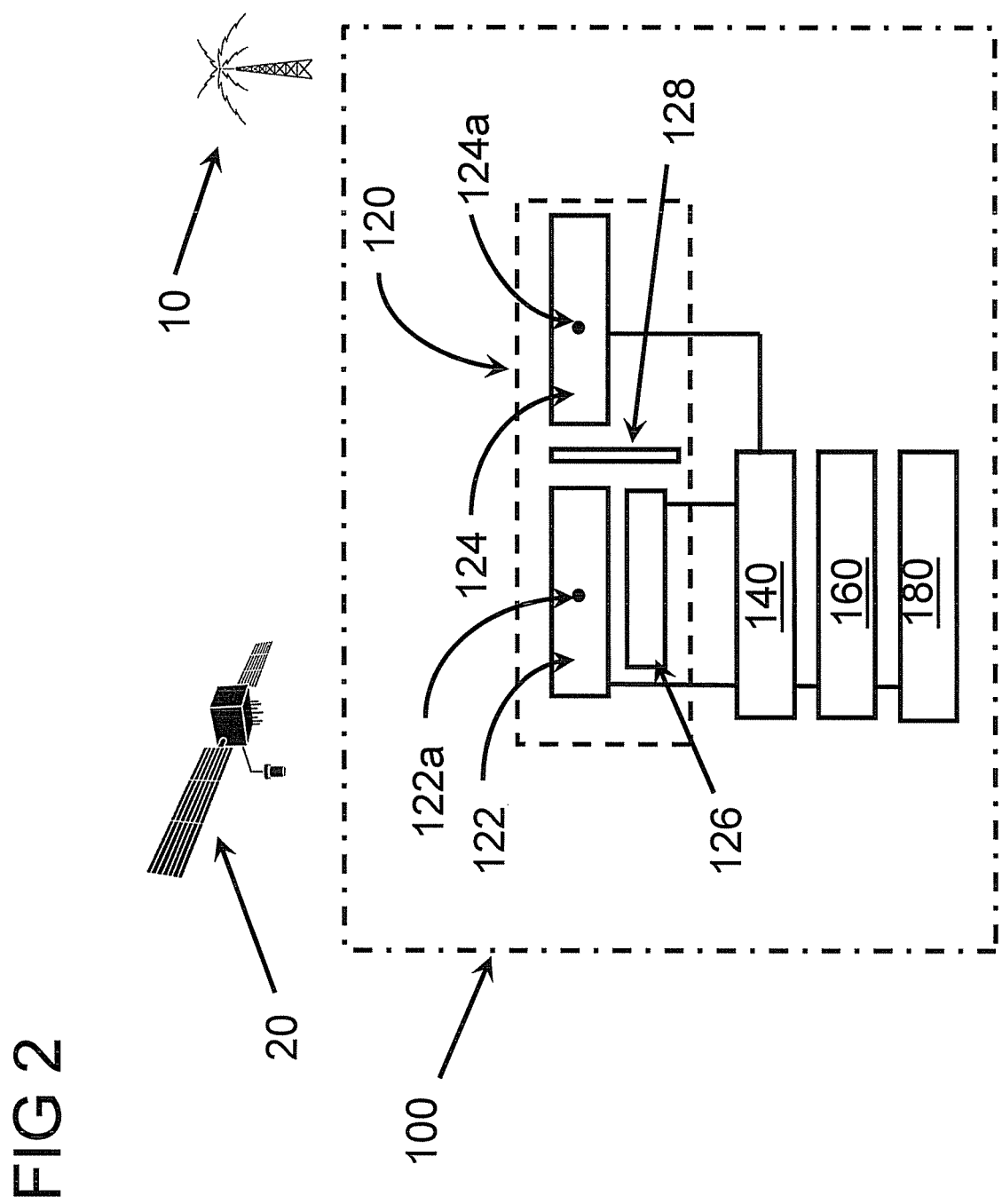
FIG. 2 is a block diagram illustrating an exemplary system for GPS anti-spoofing including boresight cancellation with omnidirectional antennas according to an embodiment of the subject matter described herein.

FIG. 2 is a block diagram illustrating an exemplary system for GPS anti-spoofing including boresight cancellation with omnidirectional antennas according to an embodiment of the subject matter described herein. In the embodiment illustrated in FIG. 2, a device 100 disclosed herein to mitigate signals from an interfering source 10 as means of enhancing the signal to noise ratio (SNR) of GPS signals from one or more satellite 20 includes at least one of: antenna set 120, signal modifying circuitry 140 (hereinafter "modifier"), signal converter 160 and receiver 180. Antenna set 120 includes first antenna 122, second antenna 124 and emitter antenna 126, which antennas are of any type that can receive or emit an RF signal. First antenna 122 has phase center 122a with respect to at least one frequency and second antenna 124 includes phase center 124a with respect to at least one frequency In one embodiment, antenna set 120 includes feedback or cosite interference preventer 128 of any type that can mitigate reception of signals from emitter 126 by second antenna 124.

Modifier 140 may be any type that can modify, for at least one antenna signal, at least one of: amplitude, phase and group delay. Modifier 140 includes any type that can reduce distortion in at least one antenna signal according to the invention disclosed in PCT application serial number PCT/US11/49399, filed on Aug. 26, 2011, and U.S. Provisional Patent Application Ser. No. 61/546,784, filed Oct. 13, 2011, assigned to the assignee of the present invention, herein incorporated by reference in their entireties. Signal converter 160 may be any type that can convert RF signals to digital form. Receiver 180 may be any type that can process converted signal to provide a desirable output, such as signal, data, message or display.

In one embodiment, first antenna 122 and second antenna 124 are coplanar and have proximately placed phase centers 122*a*, 124*a*, e.g. closely proximate for wide cancellation bandwidth or other placement for other cancellation bandwidth. In one embodiment, emitter 126 is mounted parallel to, directed at, and closely proximate first antenna 122, although other locations, orientations and/or separations are also acceptable. In one embodiment, first antenna 122 and second antenna 124 are omnidirectional, although other direction types are acceptable. Emitter 126 is directional in direction of first antenna 122 although other direction types are acceptable. In some cases, device 100 includes shielding 128 or other means of mitigating interaction signal induction in second antenna signal or third antenna signal by signal transmitted by emitter 126.

Figure 3:
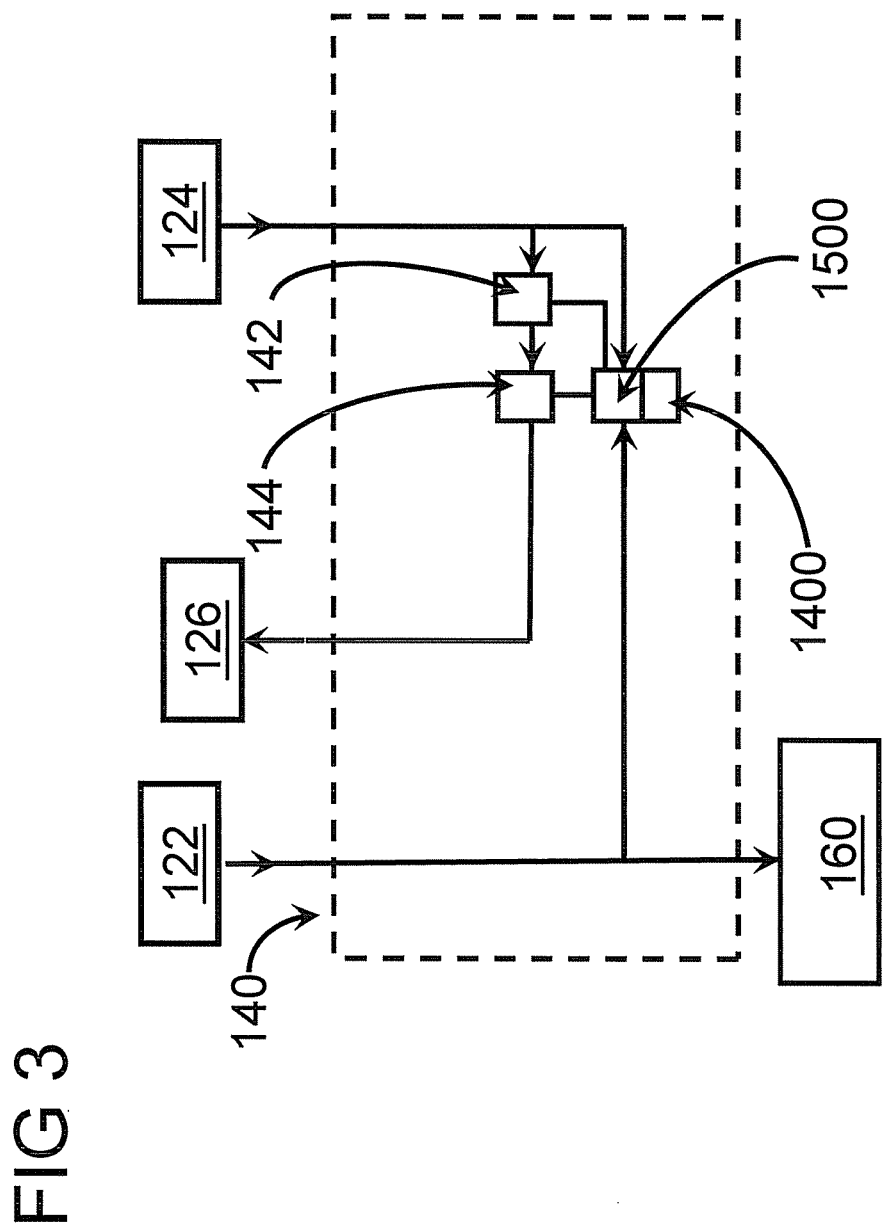
FIG. 3 is a block diagram illustrating exemplary modifying circuitry according to an embodiment of the subject matter described herein.

FIG. 3 is a block diagram illustrating exemplary modifying circuitry according to an embodiment of the subject matter described herein. In the embodiment illustrated in FIG. 3, modifier 140 includes elements of any type that can provide at least one of: time delay, amplification and phase shift. For example, modifier 140 can include an amplifier 142 and a phase shifter 144. Amplifier 142 of any type that can increase or decrease amplitude of second antenna signal for amplitude equalization respect to first antenna signal amplitude. Amplifier may be any type that can be controlled by a signal from a controller or exogenous source.

Phase shifter 144 may be any type that can provide a desirable phase shift of second antenna signal with respect to first antenna signal according to the method described below. Illustrative type of phase shifter 144 includes, but is not limited to, controllable, fixed, continuously variable, selectable, of a combination thereof. Phase shifter may be any type that can be controlled by a controller or exogenous control signal such as a bias voltage.

Modifier 140 includes a controller 1400 of any type that can determine and/or provide control signal providing desirable phase shift of at least one signal, e.g. to provide anti-phase alignment between antenna signals. Controller 1400 includes at least one of: analog to digital converter, digital processor, digital to analog converter, exogenous signal source. Controller 1400 includes a signal detector 1500 of any type that can determine at least one of: amplitude, phase and delay of one or more signal at one or more frequency, such as power detector or spectrum analyzer chip. In some cases, detector 1500 is configured to operate with respect to desirable center frequency and/or passband width.

Figure 4:
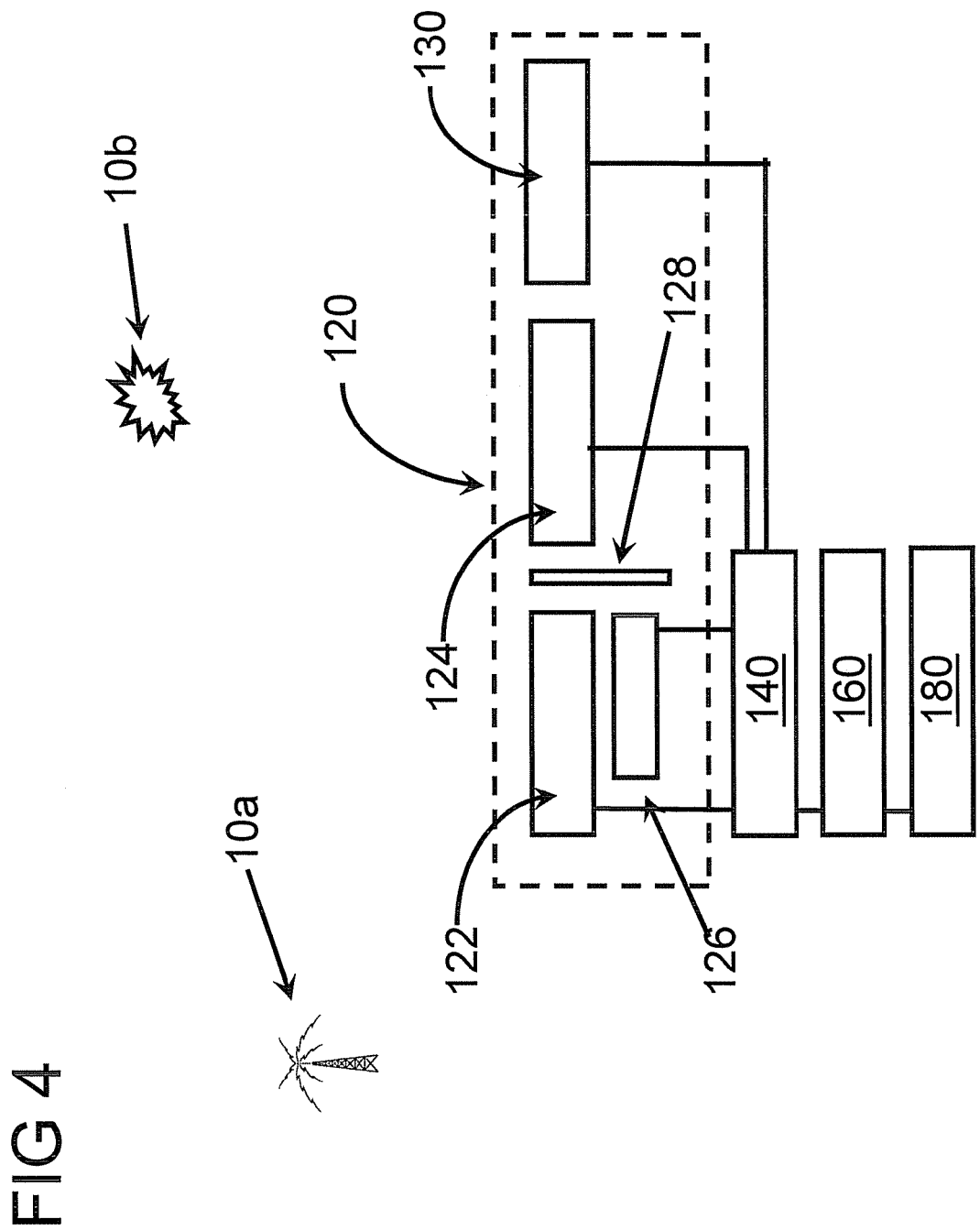
FIG. 4 is a block diagram illustrating an exemplary device for further enhanced GPS reception according to an embodiment of the subject matter described herein.

FIG. 4 is a block diagram illustrating an exemplary device for further enhanced GPS reception according to an embodiment of the subject matter described herein. In the embodiment illustrated in FIG. 4, device 100 may be any type that can cancel interference from a first source 10*a* and a second source 10*b*, said device 100 comprising an antenna set 120 further comprising a first antenna 122, second antenna 124, emitter 126, cosite blocker 128 and third antenna 130, and modifier circuitry 140 of any type that can modify signal from second antenna 124 and modify signal from third antenna 130.

Figure 5:
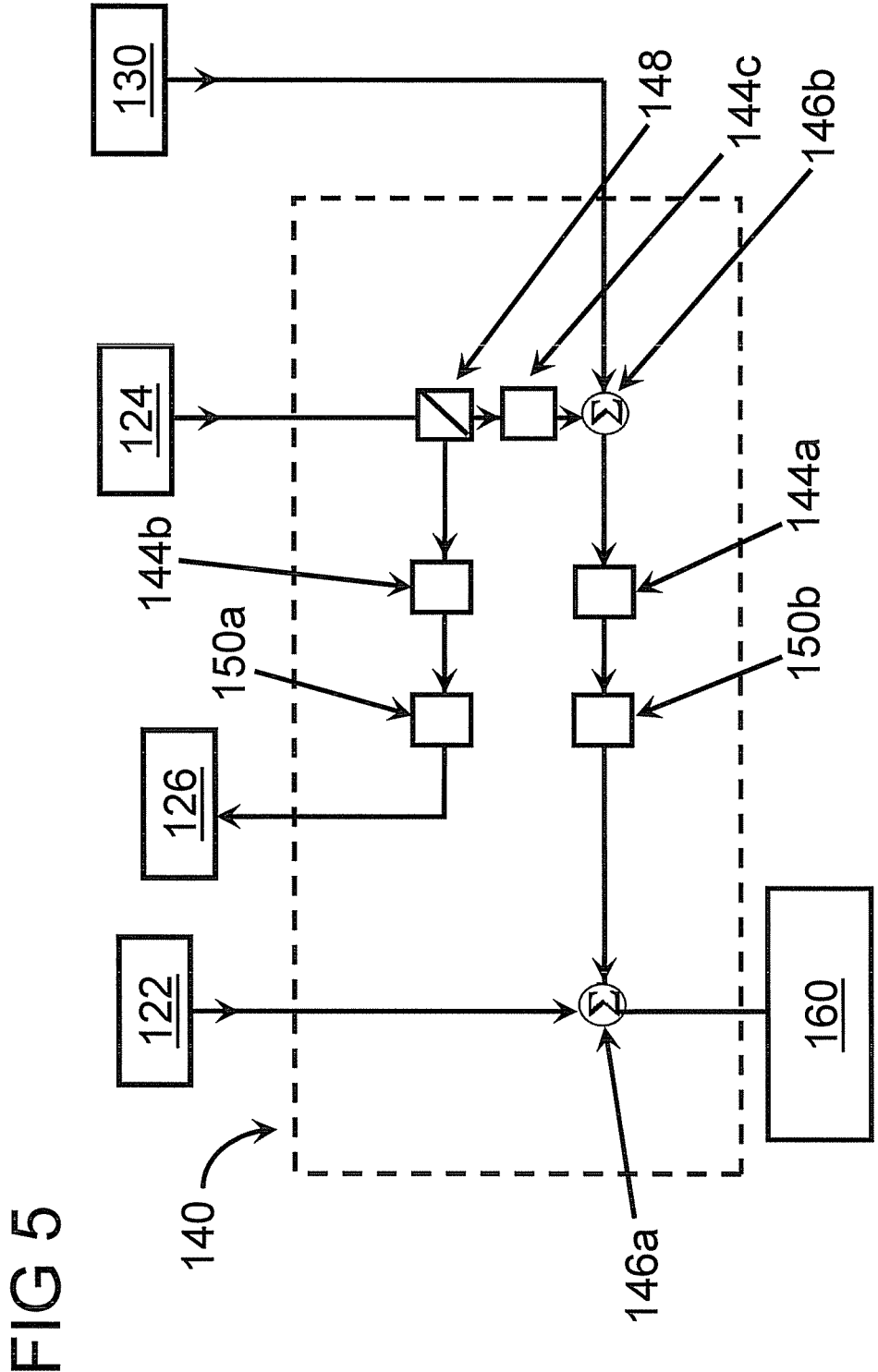
FIG. 5 is a block diagram illustrating exemplary modifying circuitry for further enhanced GPS reception according to another embodiment of the subject matter described herein.

FIG. 5 is a block diagram illustrating exemplary modifying circuitry for further enhanced GPS reception according to another embodiment of the subject matter described herein. In the embodiment illustrated in FIG. 5, modifier 140 may be any type that can modify signal from second antenna 124 to provide desirably modified signal to emitter 126 to be emitted in direction of first antenna 122 as means of creating an anti-phase interaction signal at surface of first antenna 122 that can at least partly cancel interference from a first source at the antenna surface and that can modify the signal from a third antenna 130 using a phase shifter 144*a* and combine said modified third antenna signal with output signal from first antenna 122 using a combiner 146*a* to further cancel interference from first source.

Modifier 140 can be modified by including a splitter (148) to split signal from second antenna 124 to provide two split signals, the first split signal being modified by a phase shifter 144*b* and emitted by emitter 126 to provide interaction signals at surface of first antenna 122 to cancel interference from first source to provide a first output signal from first antenna 122 substantially free of interference from first source. Second split signal is modified by a phase shifter 144*c* and combined with signal from third antenna 130 using a combiner 146*b* to cancel interference from first source to provide a second output signal substantially free of interference from first source. Example phase shifters include, but are not limited to, vector modulators. In some cases, phase shifter (144*a*, 144*b*, 144*c*) comprises variable amplifier type. Second output signal is combined with output signal from first antenna 122 using a combiner 146*a* to provide a final output signal that is substantially free of interference from first source and substantially free of interference from said second source.

In some cases, modifier 140 includes a delay element 150*a*, 150*b* of any type that can at least partly reduce difference in delay between third antenna signal and first antenna signal, e.g. due to circuitry elements used to modify second antenna signal. Delay element 150*a*, 150*b* may be any type that can provide a difference in group delay between first antenna signal and at least one of second antenna signal and third antenna signal.

Figure 6:
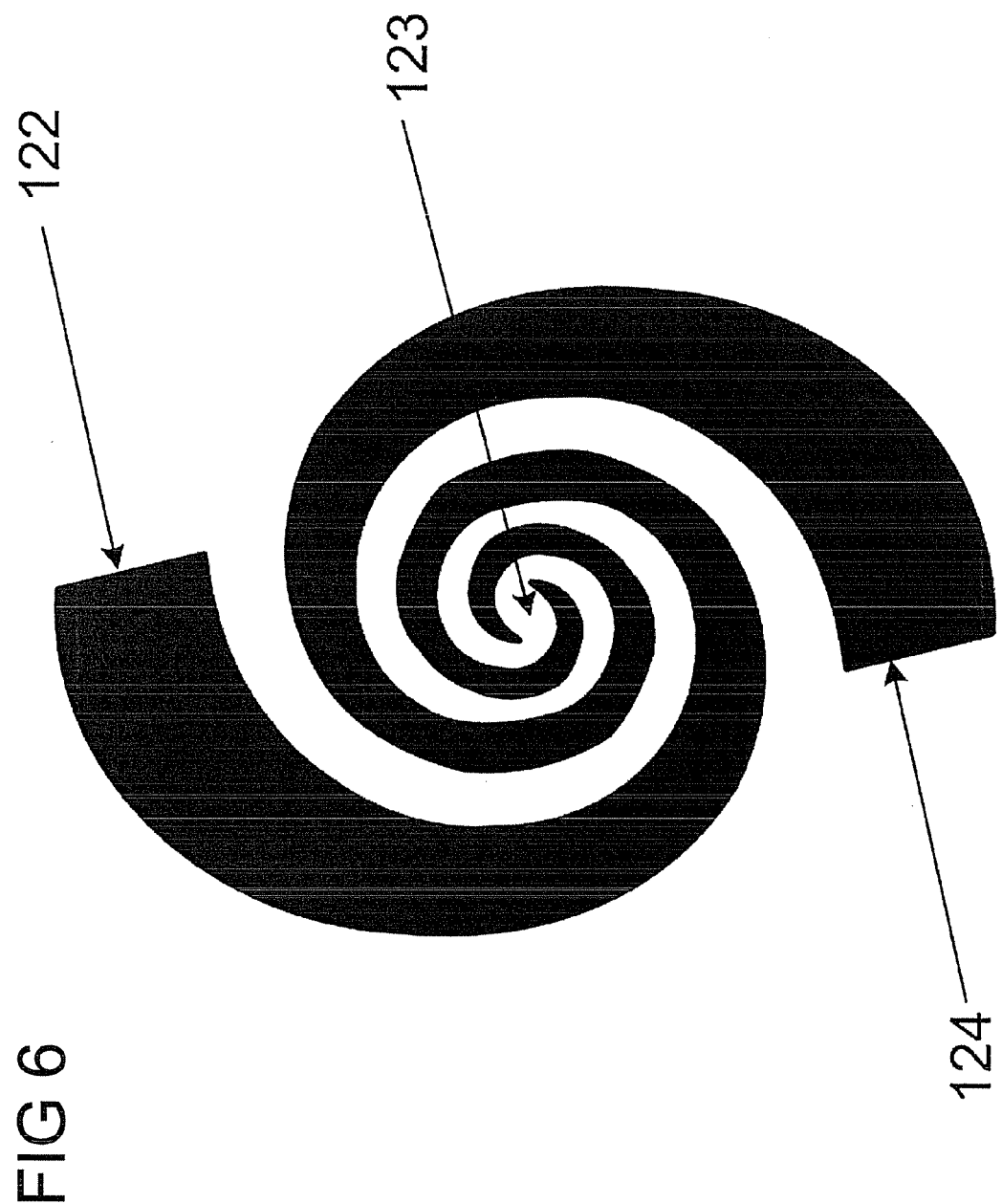
FIG. 6 illustrates the design of an antenna set having a coplanar nesting arrangement and a common origin suitable for use in a system for enhanced GPS reception according to an embodiment of the subject matter described herein.

FIG. 6 illustrates the design of an antenna set having a coplanar nesting arrangement and a common origin suitable for use in a system for enhanced GPS reception according to an embodiment of the subject matter described herein. In the embodiment illustrated in FIG. 6, antenna set 120 includes spiral type first antenna 122 and spiral type second antenna 124, which antennas 122, 124 comprise a coplanar nesting arrangement having a common origin 123. First antenna 122 and second antenna 124 have substantially the same shape, which shape provides for a lambda-constant separation of phase centers for at least one of a first frequency and a second frequency. Lambda-constant separation is defined here as phase separation comprising equal number of wavelengths, and/or part thereof, with respect to a plurality of resonant frequency of the antenna.

Figure 7:
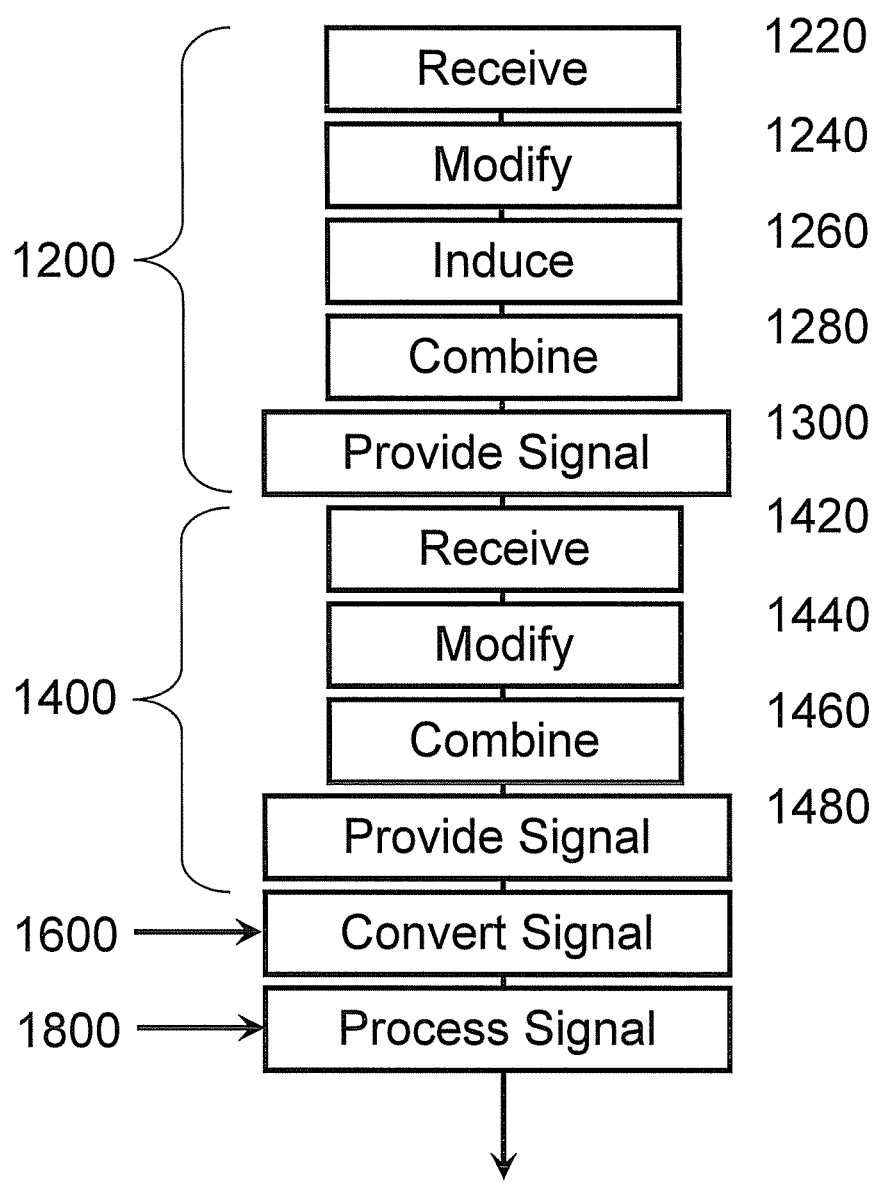
FIG. 7 is a flow chart illustrating an exemplary process for enhanced GPS reception according to an embodiment of the subject matter described herein.

FIG. 7 is a flow chart illustrating an exemplary process for enhanced GPS reception according to an embodiment of the subject matter described herein. In the embodiment illustrated in FIG. 7, method 1000 includes at least one of: interaction signal cancelling 1200, antenna signal cancelling 1400, antenna signal converting 1600 and converted signal processing 1800. Interaction signal cancelling 1200 includes; receiving first, and second antenna signals 1220, modifying and transmitting second antenna signal 1240, inducing anti-phase interaction signal 1260, canceling interference content of interfered signal at first antenna face to provide an enhanced first antenna signal 1280. Antenna signal cancelling 1400 includes; receiving third antenna signal 1420, modifying third antenna signal 1440, combining modified third antenna signal with first antenna signal to further enhance first antenna signal 1460. Converting 1600 includes any means of converting first antenna signal for processing. Processing 1800 includes digital processing of converted signal by any means to provide enhanced GPS output in at least one form of; signal, data, message and delay.

Modifying 1240 includes altering at least one of: amplitude and phase of second antenna signal and emitting the modified signal in the direction of first antenna to induce an interaction signal which is equal in amplitude and anti-phase with respect an interaction signal induced by an unmodified interfered signal at the surface of the first antenna.

Phase shifting is calculated by a method based on those disclosed in U.S. Provisional Patent Application Ser. No. 61/393,157, filed Oct. 14, 2010, and PCT Application Serial No. PCT/US11/49399, filed Aug. 26, 2011, that are assigned to the assignee of the present invention and herein incorporated by reference in their entireties, comprising using results of inducing a test phase shift of any degree, e.g. 90 degrees, into at least one antenna signal and using combined signal amplitude provided by said shift to calculate anti-phase shift providing selective cancellation of interference.

Canceling at first antenna face 1260 includes employing antenna as combiner of an interaction signal induced by signals from the emitter and interaction signal induced by interfered GPS signal. Third antenna signal modifying 1440 includes at least one of: amplitude equalizing, delaying, and anti-phase shifting with respect to first antenna signal. Combining 1460 includes using any type of circuit to combine first antenna signal and modified third antenna signal.

Converting includes by any means including but not limited to; mixing, down converting, intermediate frequency filtering, demodulating, signal conditioning or digitizing. Processing 1800 includes any means of determining desired GPS values, including but not limited to; dispreading, decoding, digital filtering, location and/or velocity calculating, time extracting, and forming display, although other forms of processing and outputting are also permitted.

In one embodiment, the signals from each of two antennas are equalized, a test phase shift is introduced into one of the antenna signals, and the two antenna signals are combined. Anti-phase shift is then calculated deterministically to minimize amplitude of combined signal ($\beta$) in equation 1;

$$\alpha(\omega t + \phi_1) + \alpha(\omega t + \phi_2 + \delta\phi) = \beta(\omega t) \quad (1)$$

where $\alpha$ is the equalized amplitude of the antenna signals, e.g. using equation 2;

$$\delta\phi = n\pi \pm 2 \arccos(\beta/2\alpha) \quad (2)$$

The system then determines which of the two values produced by equation (2) is the correct value, and applies that value. For example, the system may select each of the two values in turn, measure $\beta$ for each value, and choose the phase shift value that resulted in the lowest $\beta$. Alternatively, the system could perform a second step of test phase shifting using a second test shift, e.g. 45 degrees, to resolve the $\pm$ ambiguity in equation 2, for example by selecting the sum of test and calculated phase shifts that is reported by both the first test shift and the second test shift.

In some cases, modifying further includes mitigating cosite interference by the emitter by any means of preventing induction of emitter content in output of second antenna, e.g. by shielding or by selecting gain pattern of second antenna and/or emitter. Cosite interference by the emitter can also be mitigated by combing a feed signal from the emitter with modified second antenna signal according to the systems and methods described herein.

The method includes determining $\beta$ from time to time and, when $\beta$ has changed by a predetermined amount, updating at least one of: amplitude and phase shift of modified signal. The method includes determining calculated value of $\beta$ is optimal by any means, e.g. steepest descent or statistical methods.

An embodiment of the present invention can be operated in any manner. For example, at least one portion of the device can be operated more or less continuously as directed by external input. Modifying circuitry operation can be initiated when interference is detected, e.g. by the receiver portion of the device. Operation of modifying circuitry can be continuous without regard to presence of interference, e.g. as means of defeating spoofing type interference that can suborn navigation of a vehicle before such spoofing can be detected by current generation anti-spoofing technology.

The subject matter described herein may be applied to mitigate interference of other signals and frequencies. For example, one use of the disclosed technology is to defeat intentional or inadvertent interference that can degrade reception by cell towers of GPS signals which are used to synchronize communications across the system.

It will be understood that various details of the subject matter described herein may be changed without departing from the scope of the subject matter described herein. Furthermore, the foregoing description is for the purpose of illustration only, and not for the purpose of limitation.

What is claimed is:

1. A method of enhanced GPS receiving by mitigating interference in reception of global positioning system (GPS) signals, the method comprising:
    receiving, from a first antenna, a first signal comprising a desired signal component S1 and a jammer signal component J1;
    receiving, from a second antenna, a second signal comprising a desired signal component S2 and a jammer signal component J2;
    introducing a test phase shift into one of the first and second signals;
    combining, by a modifier circuit, the first and second signals after introducing the test phase shift to create a third signal; and
    measuring an amplitude of the third signal at a first time after introducing the test phase shift;
    deterministically calculating a phase shift based on the amplitude of the third signal at the first time and amplitudes of the first and second signals;
    at a second time later than the first time:
        modifying, using the modifier circuit, the second signal so that jammer signal component J2 is substantially anti-phase with respect to jammer signal component J1 by applying the calculated phase shift to the second signal; and
    combining, by the modifier circuit, the modified second signal and the first signal to create the third signal so that, after the second time, the third signal contains desired signal components S1 and S2 and jammer signal component J2 substantially cancels jammer signal component J1.

2. The method of claim 1 wherein deterministically calculating the phase shift comprises calculating a phase shift $\delta\phi$ according to the formula $\delta\phi = n\pi \pm 2 \arccos(\beta/2\alpha)$, $\alpha$ being an equalized amplitude of the first and second signals at the second time and $\beta$ being the amplitude of the third signal at the first time, and n being an integer.

3. The method of claim 1 comprising equalizing the first and second signals before combining the first and second signals.

4. The method of claim 1 comprising measuring the amplitudes of the first and second signals at the first time and using the measured amplitudes of the first, second, and third signals in deterministically calculating the phase shift.

5. The method of claim 1 comprising measuring the amplitude of the third signal from time to time and deterministically calculating a new phase shift using the measured amplitude of the third signal.

6. The method of claim 1 wherein combining the modified second signal with the first signal comprises summing the modified second signal with the first signal.

7. The method of claim 1 comprising providing the modified second signal to a third antenna that emits the modified second signal to create a nulling field in the vicinity of the first antenna such that the jammer signal component J1 is cancelled by destructive interference.

8. The method of claim 7 wherein the third antenna is directional.

9. The method of claim 7 comprising preventing the third antenna from creating a field in the vicinity of the second antenna.

10. The method of claim 9 wherein preventing the third antenna from creating a field in the vicinity of the second antenna comprises at least one of:
   shielding the second antenna;
   selecting a gain pattern of at least one of the second antenna and the third antenna; and
   combining a feed signal from the third antenna with the modified second signal according to the method of claim 1.

11. The method of claim 1 wherein at least one of the first antenna and the second antenna is omnidirectional.

12. The method of claim 1 wherein the first and second antennas comprise a lambda-constant design wherein phase center separation in terms of wave length is the same across a range of receive frequencies.

13. The method of claim 1 wherein, for each antenna signal, the jammer to signal ratios have a value >1 dB.

14. The method of claim 1 wherein, for each antenna signal, the jammer to signal ratios have a value >5 dB.

15. The method of claim 1 wherein, for each antenna signal, the jammer to signal ratios have a value >10 dB.

16. The method of claim 1 wherein, for each antenna signal, the jammer to signal ratios have a value >20 dB.

17. The method of claim 1 comprising processing the third signal to provide enhanced GPS output of at least one type of: signal, message, data, and display.

18. The method of claim 17 wherein processing the third signal includes performing at least one of: mixing; down converting; filtering, signal conditioning; analog-to-digital converting; decoding; dispreading; determining at least one of location and time; and providing at least one output type of position, navigation, and timing.

19. A system for enhanced GPS receiving by mitigating interference in reception of global positioning system (GPS) signals, the system comprising:
   a first antenna for receiving a first GPS signal comprising a desired signal component S1 and a jammer signal component J1;
   a second antenna for receiving a second GPS signal comprising a desired signal component S2 and a jammer signal component J2; and
   a modifier circuit configured for:
      introducing a test phase shift into one of the first and second signals, combining the first and second signals after introducing the test phase shift to create a third signal, measuring an amplitude of the third signal at a first time after introducing the test phase shift, and deterministically calculating a phase shift based on the amplitude of the third signal at the first time and amplitudes of the first and second signals;
      at a second time later than the first time, modifying the second signal so that jammer signal component J2 is substantially anti-phase with respect to jammer signal component J1, by applying the calculated phase shift to the second signal, and using the modified second signal to modify the first signal to create the third signal so that, after the second time, the third signal contains desired signal components S1 and S2 and jammer signal component J2 substantially cancels jammer signal component J1.

20. The system of claim 19 wherein deterministically calculating the phase shift comprises calculating a phase shift $\delta\phi$ according to the formula $\delta\phi = n\pi \pm 2\arccos(\beta/2\alpha)$, $\alpha$ being an equalized amplitude of the first and second signals at the second time and $\beta$ being the amplitude of the third signal at the first time, and n being an integer.

21. The system of claim 19 wherein the modifier circuit includes a sensing means for determining at least one of a phase, an amplitude, and a delay of the first signal relative to the second signal.

22. The system of claim 19 wherein the system is configured for equalizing the first and second signals before combining the first and second signals.

23. The system of claim 19 wherein the modifier circuit is configured for measuring the amplitudes of the first and second signals at the first time and using the measured amplitudes of the first, second, and third signals in deterministically calculating the phase shift.

24. The system of claim 19 wherein using the modified second signal to modify the first signal to create a third signal comprises combining the modified second signal with the first signal to create the third signal, and wherein the modifier circuit is configured for measuring the amplitude of the third signal from time to time and deterministically calculating a new phase shift using the measured amplitude of the third signal.

25. The system of claim 24 wherein combining the modified second signal with the first signal comprises summing the modified second signal with the first signal.

26. The system of claim 19 wherein the modifier circuit is configured for providing the modified second signal to a third antenna that emits the modified second signal to create a nulling field in the vicinity of the first antenna such that the jammer signal component J1 is cancelled by destructive interference.

27. The system of claim 26 wherein the third antenna is directional.

28. The system of claim 26 comprising preventing the third antenna from creating a nulling field in the vicinity of the second antenna.

29. The system of claim 28 wherein preventing the third antenna from creating a nulling field in the vicinity of the second antenna comprises at least one of:
   shielding the second antenna;
   selecting a gain pattern of at least one of the second antenna and the third antenna; and
   combining a feed signal from the third antenna with the modified second signal according to the method of claim 1.

30. The system of claim 19 wherein at least one of the first antenna and the second antenna is omnidirectional.

31. The system of claim 19 wherein, for each antenna signal, the jammer to signal ratios have a value >1 dB.

32. The system of claim 19 wherein, for each antenna signal, the jammer to signal ratios have a value >5 dB.

33. The system of claim 19 wherein, for each antenna signal, the jammer to signal ratios have a value >10 dB.

34. The system of claim 19 wherein, for each antenna signal, the jammer to signal ratios have a value >20 dB.

35. The system of claim 19 wherein the first and second antennas comprise a lambda-constant design wherein phase center separation in terms of wave length is the same across a range of receive frequencies.

36. The system of claim 19 comprising a GPS receiver.

37. The system of claim 19 wherein the third signal is further processed to provide enhanced GPS output of at least one type of: signal, data, message, and display.

38. The system of claim 19 comprising a preamplifier for pre-amplifying a signal from at least one of the first and second antennas.

39. The system of claim 19 comprising a circuit for performing at least one of: amplitude equalizing; phase shifting; group delaying; signal detecting; signal amplifying; digital signal converting; and analog signal converting.

\* \* \* \* \*